(12) United States Patent
Ikebe et al.

(10) Patent No.: US 6,334,268 B1
(45) Date of Patent: Jan. 1, 2002

(54) DISK STORAGE CASE

(75) Inventors: Masaru Ikebe; Yukio Miyazaki, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/589,453

(22) Filed: Jun. 8, 2000

(30) Foreign Application Priority Data

Jun. 8, 1999  (JP) ............................. 11-160986

(51) Int. Cl.[7] ................................................ B65D 85/75
(52) U.S. Cl. ...................... 36/310; 306/308.1; 306/493
(58) Field of Search ........................ 206/308.1, 307, 206/310, 309, 312–313, 308.3, 493

(56) References Cited

U.S. PATENT DOCUMENTS

| | | | |
|---|---|---|---|
| 5,101,971 A | * 4/1992 | Grobecker | 206/232 |
| 5,259,498 A | * 11/1993 | Weisburn | 206/310 |
| 5,515,968 A | * 5/1996 | Taniyama | 206/310 |
| 5,551,559 A | * 9/1996 | Roth et al. | 206/308.1 |
| 5,682,991 A | 11/1997 | Lammerant et al. | |
| 5,803,251 A | * 9/1998 | Gartz | 206/310 |
| 5,954,194 A | * 9/1999 | Simpson | 206/46 |
| 6,095,327 A | 8/2000 | Ikebe et al. | |
| 6,119,857 A | * 9/2000 | Stumpff | 206/308.1 |

FOREIGN PATENT DOCUMENTS

| | | | |
|---|---|---|---|
| EP | 531113 A | * 3/1993 | 206/308.1 |
| GB | 2256424 A | * 12/1992 | |
| JP | 8-207978 | 8/1996 | |
| JP | 10-106203 | 4/1998 | |

* cited by examiner

*Primary Examiner*—Paul T. Sewell
*Assistant Examiner*—Jila M. Mohandesi
(74) *Attorney, Agent, or Firm*—Oblon, Spivak, McClelland, Maier & Neustadt, P.C.

(57) ABSTRACT

A disk storage case comprising a main body and a cover body. The main body stores a disk-shaped medium therein and includes a bottom wall having a plurality of hold projections, side walls including extension portions extended therefrom, a front surface wall, and a back surface wall. The cover body includes a top wall, a pair of mutually opposing side walls, and a back surface wall, and the end portions of the pair of side walls of the cover body on the back surface wall side thereof is capable of being pivotally mounted on the extension portions to thereby mount the cover body on the main body in such a manner that the cover body can be opened and closed. The height of the back surface wall of the cover body is set substantially equal to the thickness of the disk storage case when the cover body is closed.

6 Claims, 4 Drawing Sheets

DISK STORAGE CASE

CROSS-REFERENCE TO RELATED APPLICATIONS

This application is related to and claims priority, under 35 U.S.C. §119, from Japanese Patent Application No. Hei 11-16986, filed on Jun. 8, 1999, the entire contents of which are hereby incorporated by reference herein.

BACKGROUND OF THE INVENTION

1. Field of the Invention

The present invention relates to a disk storage case for storing therein a disk-shaped medium, especially, a disk-shaped medium such as a CD (compact disk) not stored in a cartridge.

2. Description of the Related Art

Referring to a conventional disk storage case of this type, as a first example, there is known a disk storage case which is disclosed in JP-A-10-106203. This disk storage case comprises a main body, a cover body, and a tray including a plurality of hold projections which can be engaged with a center hole formed in a disk-shaped medium to thereby be able to hold the disk-shaped medium center hole, while the tray is mounted on the main body.

As a second example, there is known a disk storage case which is disclosed in JP-A-8-207978. This disk storage case comprises a main body and a cover member but does not employ such tray as used in the above-mentioned first example, while a plurality of hold projections engageable with a disk-shaped medium to thereby be able to hold the disk-shaped medium are integrally provided on and projected from the main body. In the second example, when compared with the first example, not only the thickness of the whole of the disk storage case can be reduced by an amount equivalent to the omitted tray, but also the number of parts used to manufacture the disk storage case can be reduced, thereby being able to reduce the cost of the present disk storage case.

However, in the above-mentioned conventional disk storage cases, there are still left the following problems to be solved.

Here, as the disk-shaped medium, there are used not only mediums such as a CD and a CD-ROM in which some kinds of data are previously recorded, but also mediums such as recordable CDs (CD-R and CD-RW). In the latter type, the contents recorded in the disk-shaped medium are entered in an index card, the index card is stored into a disk storage case, and the disk storage case is kept with the disk-shaped medium entered therein. In the keeping, the disk storage case is generally set on end; therefore, it is necessary that the portion of the disk storage case in which the title of the index card is to be written or entered is positioned on the side surface of the disk storage case.

Now, in the first example of the above-mentioned conventional disk storage cases, the tray must be removed when the index card is stored into and taken out from the disk storage case; that is, each time when the contents entered in the index card are changed, the tray must be removed, which is troublesome and inconvenient.

Also, in the second conventional example, it can be expected that the index card can be stored in the portion of the cover body having a U-shaped section. However, since the portion having a U-shaped section is short in the internal width thereof, it is not possible to secure a sufficient size for the title portion of the index card that enters the portion having a U-shaped section; and, even when the title can be entered there, the entered contents are difficult to read. Here, in case where the internal width of the portion having a U-shaped section is increased, the width of the title portion of the index card can be increased, but this raises another problem that the above-mentioned reduction in the thickness of the whole disk storage case cannot be achieved.

SUMMARY OF THE INVENTION

In view of the above, the present invention aims at eliminating the drawbacks found in the above-mentioned conventional disk storage cases. Accordingly, it is an object of the invention to provide a disk storage case which can be reduced in thickness over the whole case and also is able to secure, on the side surface thereof, a sufficient width for an index card.

In attaining the above object, according to a first aspect of the invention, there is provided a disk storage case, comprising: a main body for storing a disk-shaped medium therein; and, a cover body, wherein the main body includes not only a bottom wall having a plurality of hold projections respectively formed in the center portion thereof integrally therewith so as to be engageable with a center hole formed in the disk-shaped medium for holding the disk-shaped medium center hole, a pair of mutually opposing side walls, a front surface wall, and a back surface wall respectively disposed on the outer edges of the bottom wall, but also extension portions respectively formed on the respective one-end sides of the pair of side walls formed in such a manner that they are extended from and along the side walls; the cover body includes a top wall, a pair of mutually opposing side walls and a back surface wall respectively disposed on the outer edges of the top wall, and the cover body is also structured such that the end portions of the pair of side walls on the back surface wall side thereof can be pivotally mounted on the extension portions to thereby be able to mount the cover body on the main body in such a manner that the cover body can be opened and closed; and, the height of the back surface wall of the cover body is set substantially equal to the thickness of the disk storage case when the cover body is closed.

According to a second aspect of the invention, in a disk storage case according to the first aspect of the invention, there is further included an L-shaped index card having a main surface portion and a back surface portion, wherein, on the pair of side walls of the cover body, there are disposed hold pieces with a given clearance between the top wall and themselves, the main surface portion of the index card is disposed so as to extend along the inner surface side of the top wall and is held by the hold pieces, and the back surface portion of the index card is disposed so as to extend along the inner surface side of the back surface wall of the cover body.

According to a third aspect of the invention, in a disk storage case according to the second aspect of the invention, when the cover body is closed, the upper end face of the back surface wall of the main body is allowed to support the index card.

Further, according to a fourth aspect of the invention, in a disk storage case according to any one of the first to third aspects of the invention, along the bottom wall of the main body, there is disposed an auxiliary wall extending from the back surface wall of the main body to the extension portions side thereof.

In a disk storage case according to the first aspect of the invention, the cover body can be mounted on the extension portions of the main body in such a manner that it can be opened and closed. In addition, when the cover body is closed, the back surface wall of the cover body forms the side surface of the disk storage case. Therefore, the width of the back surface wall of the cover can be lengthened up to the maximum, which makes it possible to increase the size of the title of the index card to be mounted on the present back surface wall, so that the index card title can be made easy to see.

In a disk storage case according to the second aspect of the invention, the index card is mounted in such a manner that the main surface portion thereof extends along the top wall of the cover body and the back surface portion thereof extends along the back surface wall of the cover body. Also, the index card is held by the hold pieces respectively provided on the side walls of the cover body. Owing to this, the back surface portion of the index card can be set equal in size to the back surface wall of the cover body. Also, mounting and removal of the index card can be facilitated.

In a disk storage case according to the third aspect of the invention, when the cover body is closed, the index card is supported by the upper end face of the back surface wall of the main body. Therefore, the index card after it is mounted can be stabilized further.

Further, in a disk storage case according to the fourth aspect of the invention, when the cover body is closed, a clearance between the back surface wall of the main body and the back surface wall of the cover body is narrowed due to the auxiliary wall. This makes it possible to improve the appearance of the disk storage case.

BRIEF DESCRIPTION OF THE DRAWINGS

FIG. 1A is a plan view of the main body, showing the inner surface side thereof and FIG. 1B is a section view taken along the line A—A shown in FIG. 1A;

FIG. 2A is a plan view of the cover body, showing the inner surface side thereof, and FIG. 2B is a cross-sectional view taken along the line 2B—2B shown in FIG. 2A.

DETAILED DESCRIPTION OF THE PREFERRED EMBODIMENTS

Figure 1A:
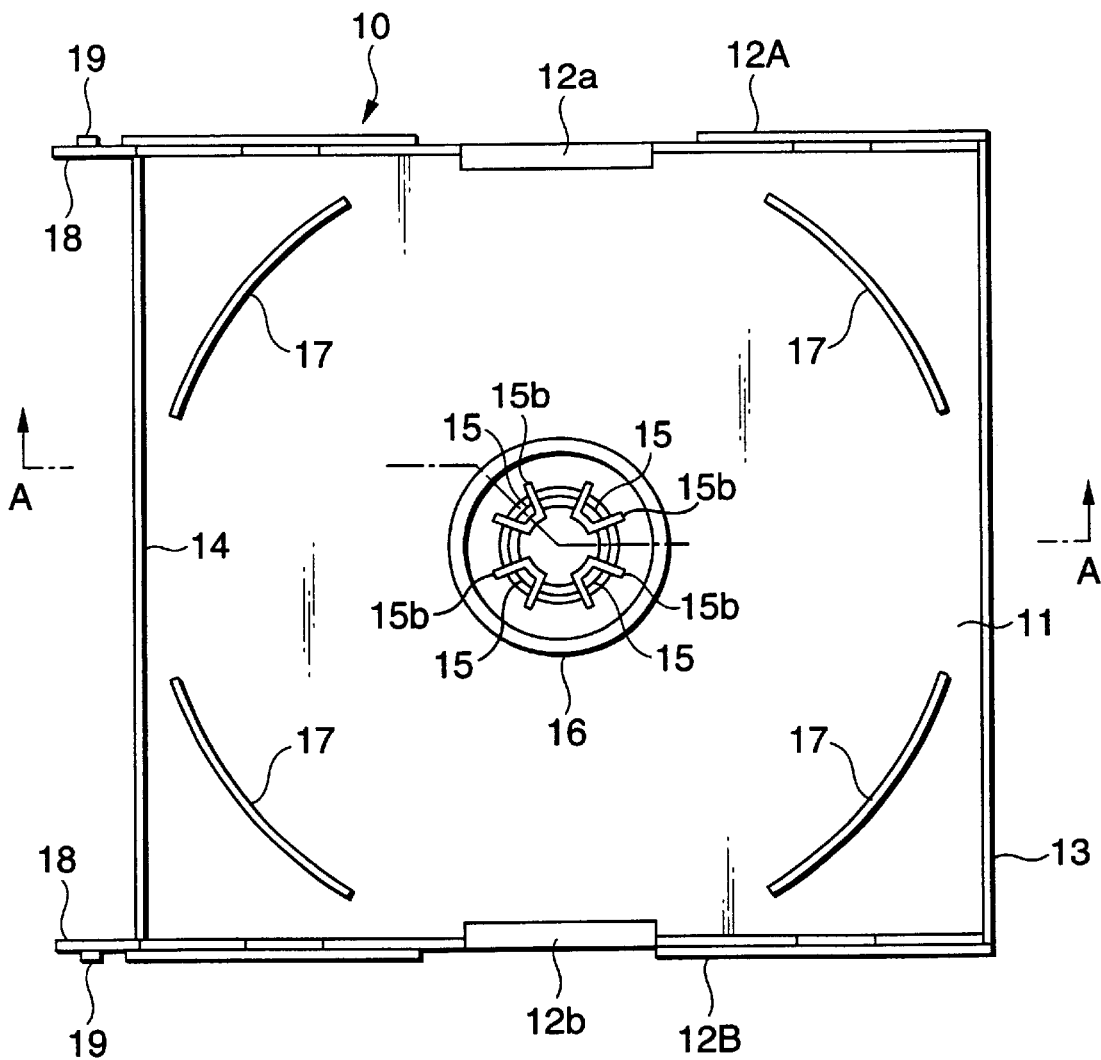
FIGS. 1A and 1B show the main body of a disk storage case according to a first embodiment of the invention; and, in particular.
Figure 1B:
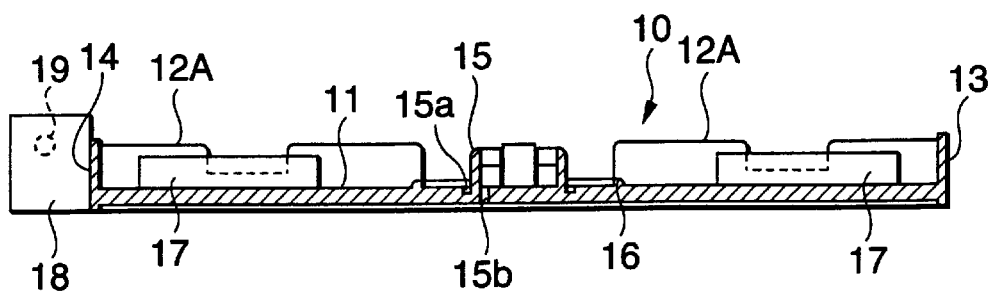

Now, description will be given below of a first embodiment of a disk storage case according to the invention with reference to the accompanying drawings. The disk storage case according to the present embodiment comprises a main body 10 and a cover body 20. Here, FIGS. 1A and 1B show the main body 10 of the disk storage case; and, in particular, FIG. 1A is a plan view of the main body, showing the inner surface side thereof and FIG. 1B is a section view taken along the line A—A shown in FIG. 1A.

The main body 10 includes a bottom wall 11, two side walls 12 (12A and 12B) respectively provided on the outer edges of the bottom wall 11, a front surface wall 13, and aback surface wall 14. The bottom wall 11 is formed in a square shape and, in the central portion of the bottom wall 11, there are integrally formed four hold projections 15 which can be respectively engaged with a center hole formed in a disk-shaped medium (which will be discussed later) to thereby be able to hold the disk-shaped medium center hole. The four hold projections 15 are arranged at equal intervals in an annular manner; and, each of the hold projections 15 includes a root portion 15a connected to the bottom wall 11, and a through groove 15b which surrounds the periphery of the root portion 15a in a substantially U-shaped manner. Due to this structure, the hold projections 15 are formed such that they can be flexed elastically. Such direct provision of the hold projections 15 on the bottom wall 11 can reduce the number of parts necessary to manufacture the present disk storage case.

In the outer periphery of the hold projections 15, there is disposed a ring-shaped projection 16. This ring-shaped projection 16 is formed slightly higher than the inner surface of the bottom wall 11; and, the ring-shaped projection 16 is structured such that, when the disk-shaped medium is held by the hold projections 15, the ring-shaped projection 16 can be contacted with the unrecorded area of the surface of the disk-shaped medium to thereby prevent the recorded area of the disk-shaped medium from touching the inner surface of the bottom wall 11 directly. On the outer peripheral portion of the ring-shaped projection 16, there are disposed outer peripheral ribs 17. These outer peripheral ribs 17 are respectively formed in an arc shape and are disposed at four positions at intervals of about 90 degrees. Also, the outer peripheral ribs 17 are structured such that, when the disk-shaped medium is held on the bottom wall 11, the ribs 17 are positioned slightly outside the outer periphery of the disk-shaped medium to thereby be able to guide the disk-shaped medium.

The side walls 12 consist of a pair of mutually opposing side walls 12A and 12B. In the substantially central portions of the two side walls 12, there are formed notches 12a and 12b; and, these notches 12a and 12b are used to facilitate the removal of the disk-shaped medium held on and by the hold projections 15 of the bottom wall 11. On the left side (in FIGS. 1A and 1B) of the two side walls 12A and 12B, there are disposed extension portions 18 which are respectively extended further left from and along the back surface wall 14. On the outer surface side of each extension portion 18, there is provided a support shaft 19 on which the cover body 20 can be mounted in such a manner that the cover body 20 can be opened and closed (that is, can be rotated).

Figure 2A:
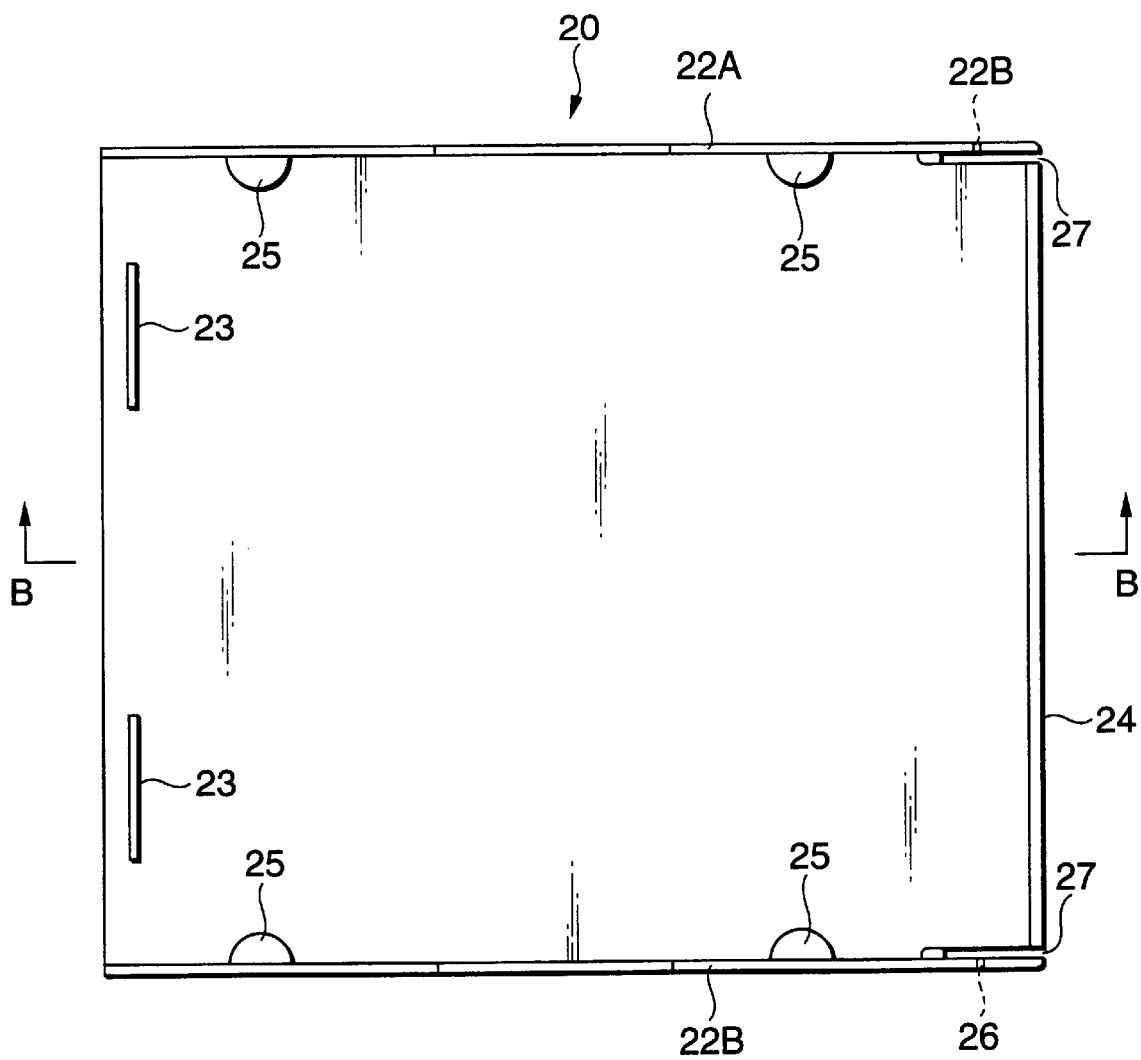
FIGS. 2A and 2B show the cover body of the disk storage case according to the first embodiment of the present invention and in particular.
Figure 2B:
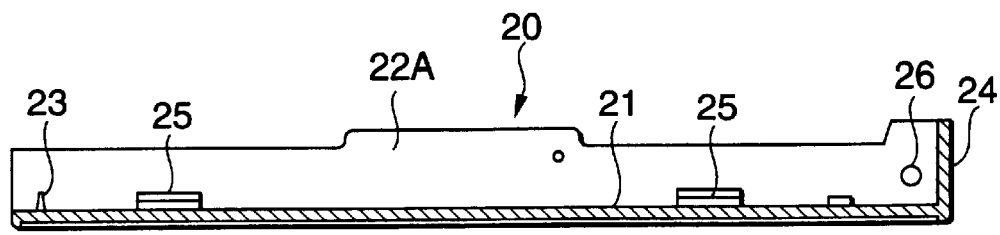

Now, FIGS. 2A and 2B show the cover body 10 of the disk storage case; and, in particular, FIG. 2A is a plan view of the cover body, showing the inner surface side thereof and FIG. 2B is a section view taken along the line B—B shown in FIG. 2A.

The cover body 20 is formed of transparent resin material, and includes a top wall 21 formed in a square shape, a pair of mutually opposing side walls 22 (22A and 22B), and a back surface wall 24 interposed between the side walls 22; but, it does not include the wall that corresponds to the front surface wall 13 disposed on the main body 10 but includes two ribs 23. These two ribs 23 can be contacted with the one end portion of an index card (which will be discussed later) to thereby be able to control the movement of the index card.

The width of the top wall 21 in the horizontal direction (in FIGS. 2A and 2B) thereof is set substantially equal to the width of the main body 10 in the horizontal direction (in FIGS. 1A and 1B) thereof.

Also, in the respective side walls 22A and 22B, there are disposed semicircular-shaped hold pieces 25 which are used to hold the index card. The hold pieces 25 are disposed by twos in each of the side walls 22A and 22B at the given positions thereof, and are arranged substantially in parallel to the inner surface of the top wall 21 with a given clearance between them.

In the vicinity of the right (in FIGS. 2A and 2B) ends of the side walls 22, there are formed holes 26 which are used to mount the cover 20 onto the main body 10 in a rotatable manner; and, each hole 26 is formed in such a size that the support shaft 19 of the main body 10 can be fitted with the hole 26. Also, in the portions of the top wall 21 that are located in the vicinity of the holes 26, there are formed notches 27 respectively. The notches 27 are formed so that the extension portions 18 of the main body 10 can be inserted into the notches 27.

The back surface wall 24 is interposed erect between the notches 27 formed on the inner surface side of the top wall 21. The height of the back surface wall 24 from the inner surface of the top wall 21 is set substantially equal to the height of the main body 10 (that is, the height from the outer surface side of the bottom wall 11 of the main body 10 up to the upper end of the back surface wall 14 of the main body 10).

On the inner surface side of the cover body 20, there is mounted an index card. The index card is curved in an L shape to thereby include a main surface portion and a back surface portion. The index card is mounted on the inner surface side of the cover body 20 in such a manner that the main surface portion thereof extends along the inner surface side of the top wall 21 and the back surface portion thereof extends along the inner surface side of the back surface wall 24; and, further, in this mounting of the index card, the main surface portion thereof is made to pass through a clearance between the top wall 21 and hold pieces 25. This manner of mounting can prevent from the index card from falling down. Also, the left-side outer edge of the main surface portion of the index card can be regulated by the ribs 23.

Here, in case where the back surface portion of the index card is formed substantially equal in size to the back surface wall 24 of the cover body 20, the whole area of the back surface wall 24 of the cover body 20 can be used as the area of the back surface portion of the index card, that is, the area of entry of the title of the index, which can facilitate the entry of the title into the back surface portion of the index card as well as the reading of the title therefrom.

Figure 3:
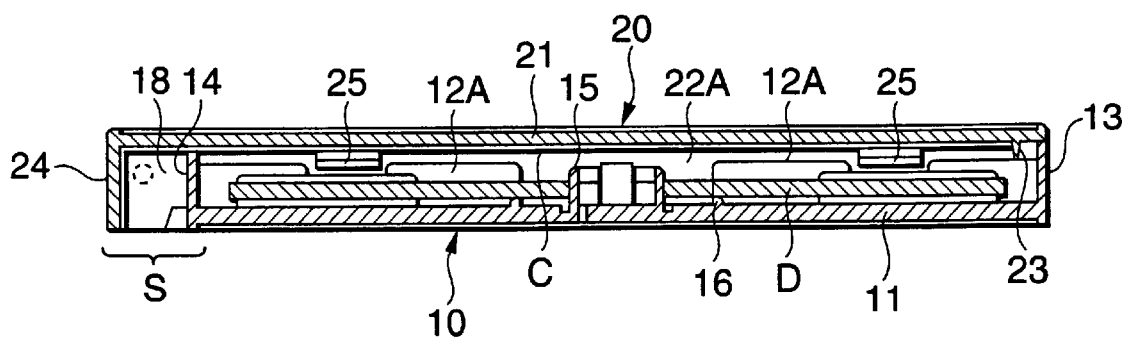
FIG. 3 is a section view corresponding to the section view taken along the line A—A shown in FIG. 1A when the cover body mounted on the main body is closed, showing a state in which a disk-shaped medium and an index card are mounted in the disk storage case.

Now, FIG. 3 is a section view corresponding to the section view taken along the line A—A shown in FIG. 1A when the cover body 20 is mounted on the main body 10 and the cover body 20 is then closed, showing a state in which a disk-shaped medium D and an index card C are mounted therein.

In case where the support shafts 19 provided on the extension portions 18 of the main body 10 are respectively inserted into the holes 26 formed in the side walls 22 of the cover body 20, the cover body 20 can be mounted onto the main body 10 in such a manner that it can be opened and closed, that is, can be swung with the centers of the support shafts 19 of the main body 10 as the swing fulcrums thereof, thereby being able to produce the disk storage case according to the present embodiment.

In case where the cover body 20 is held opened, the center hole of the disk-shaped medium D is engaged with the hold projections 15 of the main body 10 to thereby hold the disk-shaped medium D on the inner surface of the bottom wall 11 of the main body 10, and the cover body 20 is then closed, there can be obtained the state that is shown in FIG. 3.

When the cover body 20 is closed, the right (in FIG. 3) end portion of the inner surface side of the top wall 21 of the cover body 20 is contacted with the upper end face of the front surface wall 13 of the main body 10. Also, at that time, the upper end face of the back surface wall 14 of the main body 10 is allowed to approach the index card C which is mounted on the inner surface side of the top wall 21 of the cover body 20. That is, when the cover body 20 is closed, the index card C is further supported by the back surface wall 14 of the main body 10 as well, which shows that the back surface wall 14 of the main body 10 plays an auxiliary role in holding the index card C. This can achieve further stabilized holding of the index card C.

Figure 4:
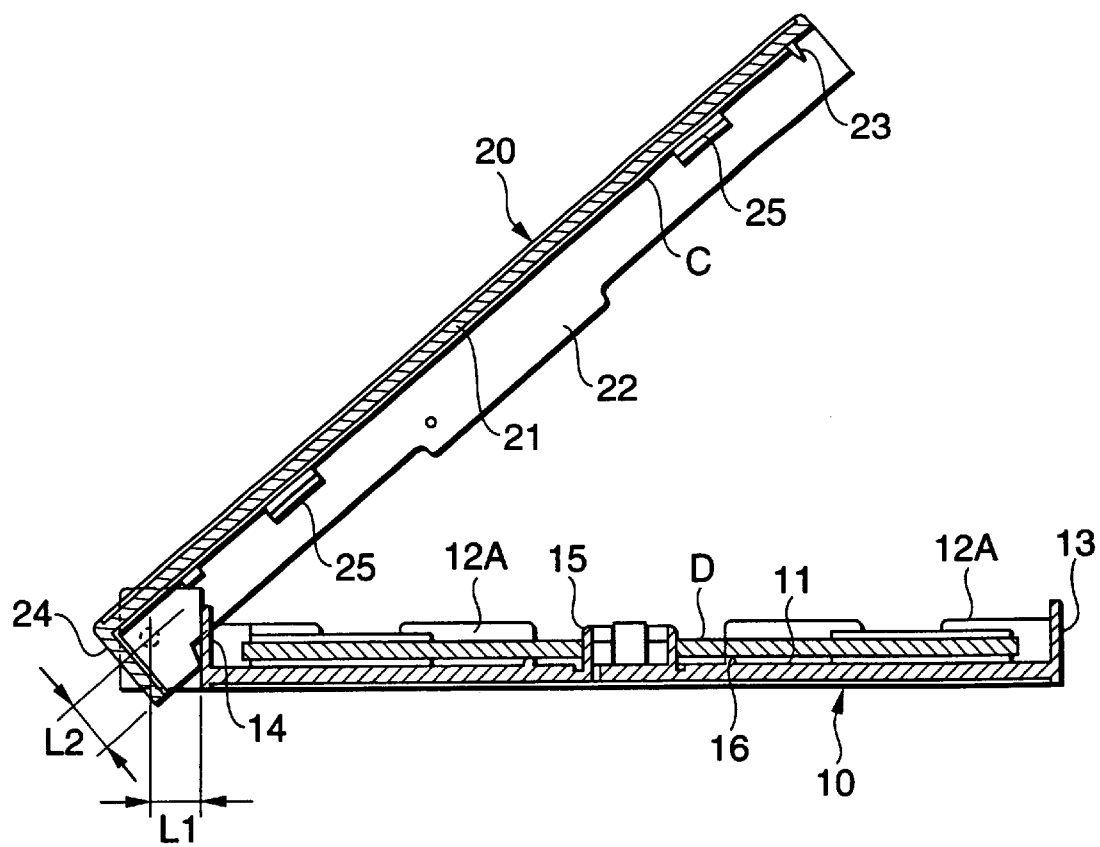
FIG. 4 is a section view, showing a state in which the cover body starts to open from the closed state shown in FIG. 3; and, FIGS. 5A and 5B show a main body employed in a second embodiment of a disk storage case according to the present invention and in particular.

Now, FIG. 4 is a section view showing a state in which the cover body 20 starts to open from the closed state thereof shown in FIG. 3. When the cover body 20 is opened, preferably, the main body 10 and cover body 20 may show a flat state, that is, the cover body 20 may be opened at an angle of 180 degrees or larger. In this case, as shown in FIG. 4, assuming that the length from the center of swing of the main body 10 and cover body 20 to the back surface wall 14 of the main body 10 is expressed as L1 and the length from the center of swing to the upper surface of the back surface wall 24 of the cover body 20 is expressed as L2, L1 may be set larger than L2.

Figure 5A:
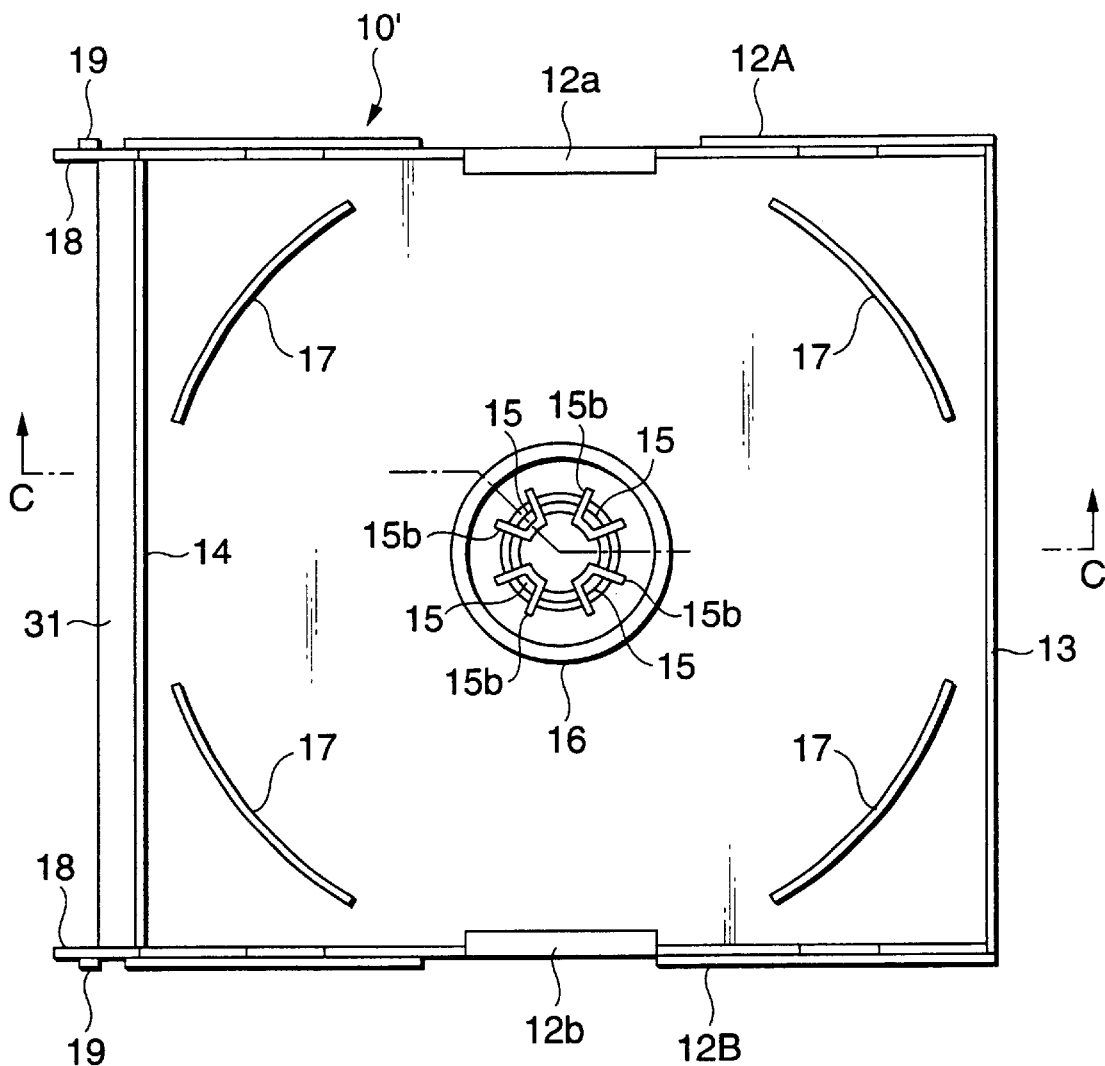
FIG. 5A is a plan view of the main body, showing the inner surface side thereof.
Figure 5B:
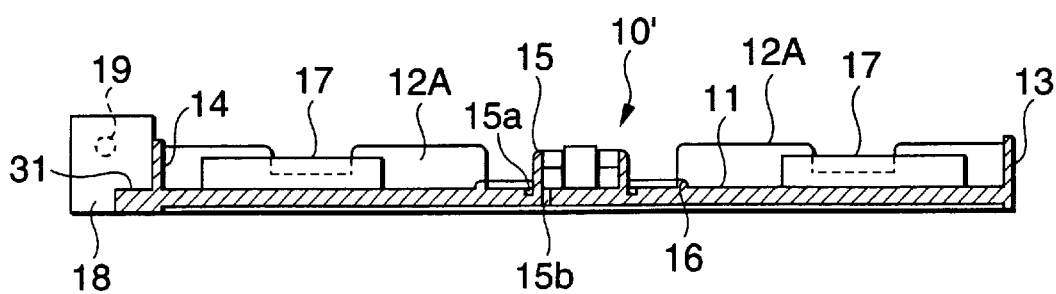
FIG. 5B is a cross-sectional view taken along the line 5B—5B shown in FIG. 5A.

Now, FIGS. 5A and 5B show a main body 10' employed in a second embodiment of a disk storage case according to the invention; and, in particular, FIG. 5A is a plan view of the main body 10', showing the inner surface side thereof and FIG. 5B is a section view taken along the line C—C shown in FIG. 5A.

The present main body 10' is different from the main body 10 employed in the first embodiment in that the main body 10' includes an auxiliary wall 31. The remaining portions of the main body 10' are the same as those of the main body 10 employed in the first embodiment.

In case where there is provided the auxiliary wall 31 as in the present embodiment, when the cover body 20 is closed, a clearance (in FIG. 3, S) between the back surface wall 24 of the cover body 20 and the back surface wall 14 of the main body 10 can be set small. However, the auxiliary wall 31 must be formed so as to have such a length that never causes any obstacle to the opening and closing of the cover body 20, that is, a length that can prevent mutual interference between the back surface wall 24 of the cover body 20 and the back surface wall 14 of the main body 10.

As has been described heretofore, according to the first aspect of the invention, not only the number of parts can be reduced and the thickness of the disk storage case can be reduced, but also the inner surface side area of the side surface of the disk storage case can be widened to thereby be able to facilitate the entry and reading of the title of the index card.

According to the second aspect of the invention, an index card having a wide back surface portion can be mounted and also the mounting and removal of the index card can be facilitated.

Also, according to the third aspect of the invention, the index card can be supported on the main body side as well, which makes it possible to further stabilize the index card while it is mounted.

Further, according to the fourth aspect of the invention, due to provision of the auxiliary wall, a clearance between the back surface wall of the main body and the back surface wall of the cover body can be reduced. This not only can improve the appearance of the disk storage case but also can reduce the possibility of dust being mixed into the disk storage case.

While only certain embodiments of the invention have been specifically described herein, it will be apparent that numerous modifications may be made thereto without departing from the spirit and scope of the invention.

What is claimed is:

1. A disk storage case comprising:
    a main body for storing a disk-shaped medium therein, said main body including
        a bottom wall including a plurality of hold projections formed integral therewith in a center portion thereof,
        a pair of mutually opposing side walls, each of said side walls including an extension portion formed on a first end thereof in such a manner that said extension portions extend from and along said side walls,
        a front surface wall, and
        a back surface wall,
        wherein said side walls, said front surface wall, and said back surface wall of said main body are disposed on outer edges of said bottom wall of said main body; and
    a cover body including
        a top wall,
        a pair of mutually opposing side walls, and
        a back surface wall,
        wherein said side walls and said back surface wall of said cover body are disposed on outer edges of said top wall of said cover body, and an end portion of each of said pair of side walls of said cover body on a back surface wall side of said cover body are pivotally mounted on said extension portions of said main body to thereby mount said cover body on said main body in a manner that said cover body can be opened and closed, and
    wherein a height of said back surface wall of said cover body is substantially equal to a thickness of said disk storage case when said cover body is closed.

2. The disk storage case according to claim 1, further including an L-shaped index card including a main surface portion and a back surface portion,
    wherein said cover body further includes hold pieces on said pair of side walls with a given clearance between said top wall and said hold pieces, and
    wherein said main surface portion of said index card is disposed so as to extend along an inner surface side of said top wall of said cover body and is held by said hold pieces, and said back surface portion of said index card is disposed so as to extend along an inner surface side of said back surface wall of said cover body.

3. The disk storage case according to claim 2, wherein an upper end face of said back surface wall of said main body supports said index card against said inner surface side of said top wall of said cover body when said cover body is closed.

4. The disk storage case according to claim 1, wherein said main body further includes an auxiliary wall extending outwardly past said back surface wall of said main body on an extension portion side thereof along said bottom wall of said main body.

5. The disk storage case according to claim 2, wherein said main body further includes an auxiliary wall extending outwardly past said back surface wall of said main body on an extension portion side thereof along said bottom wall of said main body.

6. The disk storage case according to claim 3, wherein said main body further includes an auxiliary wall extending outwardly past said back surface wall of said main body on an extension portion side thereof along said bottom wall of said main body.

* * * * *